United States Patent
Sugaya

(10) Patent No.: US 10,633,081 B2
(45) Date of Patent: Apr. 28, 2020

(54) SYSTEM, METHOD, AND PROGRAM FOR ADJUSTING BALANCE OF PESTICIDED HUNG HELICOPTER DRONE WITH COUNTERWEIGHT

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 11 days.

(21) Appl. No.: 15/319,874

(22) PCT Filed: Jun. 30, 2016

(86) PCT No.: PCT/JP2016/069505
§ 371 (c)(1),
(2) Date: Dec. 19, 2016

(87) PCT Pub. No.: WO2018/003080
PCT Pub. Date: Jan. 4, 2018

(65) Prior Publication Data
US 2019/0118937 A1 Apr. 25, 2019

(51) Int. Cl.
*B64C 17/02* (2006.01)
*B64C 13/16* (2006.01)
(Continued)

(52) U.S. Cl.
CPC .............. *B64C 17/02* (2013.01); *A01M 1/22* (2013.01); *A01M 5/02* (2013.01); *A01M 5/06* (2013.01);
(Continued)

(58) Field of Classification Search
CPC ........ B64C 17/02; B64C 39/024; A01M 5/02; B64D 1/18
See application file for complete search history.

(56) References Cited

U.S. PATENT DOCUMENTS 3,714,987 A * 2/1973 Mattson ................... B64D 1/16
169/47
6,234,424 B1 * 5/2001 Charest ................... B64D 1/22
244/118.1
(Continued)

FOREIGN PATENT DOCUMENTS

CN 203849616 U * 9/2014
JP 11-243829 9/1999

OTHER PUBLICATIONS

Machine translation of CN203849616 (Year: 2014).*
Bibliographic info for CN203849616 (Year: 2014).*

*Primary Examiner* — Jonathan M Dager
*Assistant Examiner* — Garrett F Evans
(74) *Attorney, Agent, or Firm* — Lex IP Meister, PLLC

(57) ABSTRACT

The present invention is to provide a system, a method, and a program for adjusting the balance of an insect killer hung from a robot that are capable to adjust the position of the insect killer. The system for adjusting the balance of an insect killer 1 hung from a robot 10 moving by a propeller 410 through a support arm 100 adjusts the balance of the insect killer 200 so that the angle between the support arm 100 and the direction of gravitational force from the robot 10 has a predetermined value or more; and adds a weight 300 to an end of the same support arm 100 as the support arm 100 in the negative direction to an angle of the predetermined value and calculates the weight 300 to adjust the balance of the insect killer 200.

13 Claims, 5 Drawing Sheets

(51) Int. Cl.
    *A01M 5/06*     (2006.01)
    *A01M 1/22*     (2006.01)
    *B64C 39/02*     (2006.01)
    *A01M 7/00*     (2006.01)
    *A01M 5/02*     (2006.01)
    *B64D 1/18*     (2006.01)

(52) U.S. Cl.
    CPC ............. *A01M 7/00* (2013.01); *A01M 7/005* (2013.01); *B64C 13/16* (2013.01); *B64C 39/02* (2013.01); *B64C 39/024* (2013.01); *B64D 1/18* (2013.01); *B64C 2201/027* (2013.01); *B64C 2201/108* (2013.01); *B64C 2201/128* (2013.01); *B64C 2201/165* (2013.01)

(56) References Cited

U.S. PATENT DOCUMENTS

| | | | | |
|---|---|---|---|---|
| 8,579,234 B2 * | 11/2013 | Thompson | | B64C 39/02 244/136 |
| 9,764,703 B2 * | 9/2017 | Hoareau | | B64C 39/024 |
| 9,902,493 B2 * | 2/2018 | Simon | | B64C 29/0025 |
| 10,377,491 B1 * | 8/2019 | Fine | | B64C 39/024 |
| 2006/0097112 A1 * | 5/2006 | Hall | | A62C 3/0235 244/136 |
| 2012/0034079 A1 * | 2/2012 | Kempkey | | F03D 1/02 416/1 |
| 2014/0263834 A1 * | 9/2014 | Goodman | | B64D 47/08 244/118.1 |
| 2014/0303814 A1 * | 10/2014 | Burema | | B64D 1/16 701/3 |
| 2016/0063420 A1 * | 3/2016 | Tomii | | G06Q 10/06315 705/7.24 |
| 2016/0246304 A1 * | 8/2016 | Canoy | | G05D 1/0816 |
| 2016/0264234 A1 * | 9/2016 | Vaughn | | A63H 27/12 |
| 2016/0307448 A1 * | 10/2016 | Salnikov | | A01B 79/02 |

* cited by examiner

SYSTEM, METHOD, AND PROGRAM FOR ADJUSTING BALANCE OF PESTICIDED HUNG HELICOPTER DRONE WITH COUNTERWEIGHT

TECHNICAL FIELD

The present invention relates to a system, a method, and a program for adjusting the balance of an insect killer hung from a robot moving by a propeller through a support arm.

BACKGROUND ART

Recently, the use of a robot has been considered in various fields such as disaster relief, air photos, and agriculture, and such a robot has been put to practical use. For example, in agriculture, it is considered that a robot hangs a crop-spraying device or an insect killer for chemical spray and pest control.

For example, the constitution in which a helicopter hangs a tank storing an agent, etc., from which the agent is sprayed over farmland, is disclosed (refer to Patent Document 1).

CITATION LIST

Patent Literature

Patent Document 1: JP H 11-243829 A

SUMMARY OF INVENTION

However, in the constitution of Patent Document 1, the robot hangs an accessory such as an insect killer and a crop-spraying device is affected by wind from the propeller during flight and from an external environment, inertia during flight, and the like. As a result, the accessory may move from the desired position. For example, the accessory swings to a direction opposite to the traveling direction of the robot, swings to a position irrelevant to the traveling direction due to strong wind, and prevents harmful insects from being flown to the insect killer due to wind pressure from the propeller if the insect killer is located right below the robot.

An object of the present invention is to provide a system, a method, and a program for adjusting the balance of an insect killer hung from a robot that are capable to adjust the position of the insect killer.

The first aspect of the present invention provides a system for adjusting the balance of an insect killer hung from a robot moving by a propeller through a support arm, including:

a balance-of-insect killer adjustment unit that adjusts the balance of the insect killer so that the angle between the support arm and the direction of gravitational force from the robot has a predetermined value or more; and a weight adjustment unit that adds a weight to an end of the same support arm as the support arm in the negative direction to an angle of the predetermined value and calculates the weight to adjust the balance of the insect killer.

According to the first aspect of the present invention, a system for adjusting the balance of an insect killer hung from a robot moving by a propeller through a support arm adjusts the balance of the insect killer so that the angle between the support arm and the direction of gravitational force from the robot has a predetermined value or more; and adds a weight to an end of the same support arm as the support arm in the negative direction to an angle of the predetermined value and calculates the weight to adjust the balance of the insect killer.

The first aspect of the present invention is the category of a system for adjusting the balance of an insect killer, but the categories of a method and a program for adjusting the balance of an insect killer have similar functions and effects.

The second aspect of the present invention provides the system according to the first aspect of the present invention, in which the weight is approximately as heavy as the insect killer.

According to the second aspect of the present invention, the system according to the first aspect of the present invention, in which the weight is approximately as heavy as the insect killer.

The third aspect of the present invention provides the system according to the first aspect of the present invention further including a wind pressure-from-propeller detection unit that detects wind pressure from a propeller provided with the robot, in which the balance-of-insect killer adjustment unit calculates the detected wind pressure and adjusts the balance of the insect killer.

According to the third aspect of the present invention, the system according to the first aspect of the present invention detects wind pressure from a propeller provided with the robot, calculates the detected wind pressure, and adjusts the balance of the insect killer.

The fourth aspect of the present invention provides the system according to the first aspect of the present invention further including a wind resistance detection unit that detects wind resistance to the insect killer during flight of the robot, in which the balance-of-insect killer adjustment unit calculates the detected wind pressure and adjusts the balance of the insect killer.

According to the fourth aspect of the present invention, the system according to the first aspect of the present invention detects wind resistance to the insect killer during flight of the robot, calculates the detected wind pressure, and adjusts the balance of the insect killer.

The fifth aspect of the present invention provides the system according to the first aspect of the present invention further including: a flight speed detection unit that detects the flight speed during flight of the robot; and a flight altitude detection unit that detects the flight altitude during flight of the robot; in which the balance-of-insect killer adjustment unit calculates the detected flight speed and altitude and adjusts the balance of the insect killer.

According to the fifth aspect of the present invention, the system according to the first aspect of the present invention detects the flight speed during flight of the robot; and detects the flight altitude during flight of the robot; and calculates the detected flight speed and altitude and adjusts the balance of the insect killer.

The sixth aspect of the present invention provides the system according to the first aspect of the present invention further including a vibration detection unit that detects vibration of the robot, in which the balance-of-insect killer adjustment unit calculates the detected vibration and adjusts the balance of the insect killer.

According to the sixth aspect of the present invention, the system according to the first aspect of the present invention detects vibration of the robot, calculates the detected vibration, and adjusts the balance of the insect killer.

The seventh aspect of the present invention provides a method for adjusting the balance of an insect killer hung from a robot moving by a propeller through a support arm, including the steps of:

adjusting the balance of the insect killer so that the angle between the support arm and the direction of gravitational force from the robot has a predetermined value or more; and adding a weight to an end of the same support arm as the support arm in the negative direction to an angle of the predetermined value and calculating the weight to adjust the balance of the insect killer.

The eighth aspect of the present invention provides a computer program product for use in a system for adjusting the balance of an insect killer hung from a robot moving by a propeller through a support arm, including a non-transitory computer usable medium having a set of instructions physically embodied therein, the set of instructions including computer readable program code, which when executed by the system causes the information processing unit to:

adjust the balance of the insect killer so that the angle between the support arm and the direction of gravitational force from the robot has a predetermined value or more; and add a weight to an end of the same support arm as the support arm in the negative direction to an angle of the predetermined value and calculate the weight to adjust the balance of the insect killer.

The present invention can provide a system, a method, and a program for adjusting the balance of an insect killer hung from a robot that are capable to adjust the position of the insect killer.

DESCRIPTION OF EMBODIMENTS

Embodiments of the present invention will be described below with reference to the attached drawings. However, these are illustrative only, and the technological scope of the present invention is not limited thereto.

Overview of System for Adjusting Balance of Insect Killer 1

Figure 1:
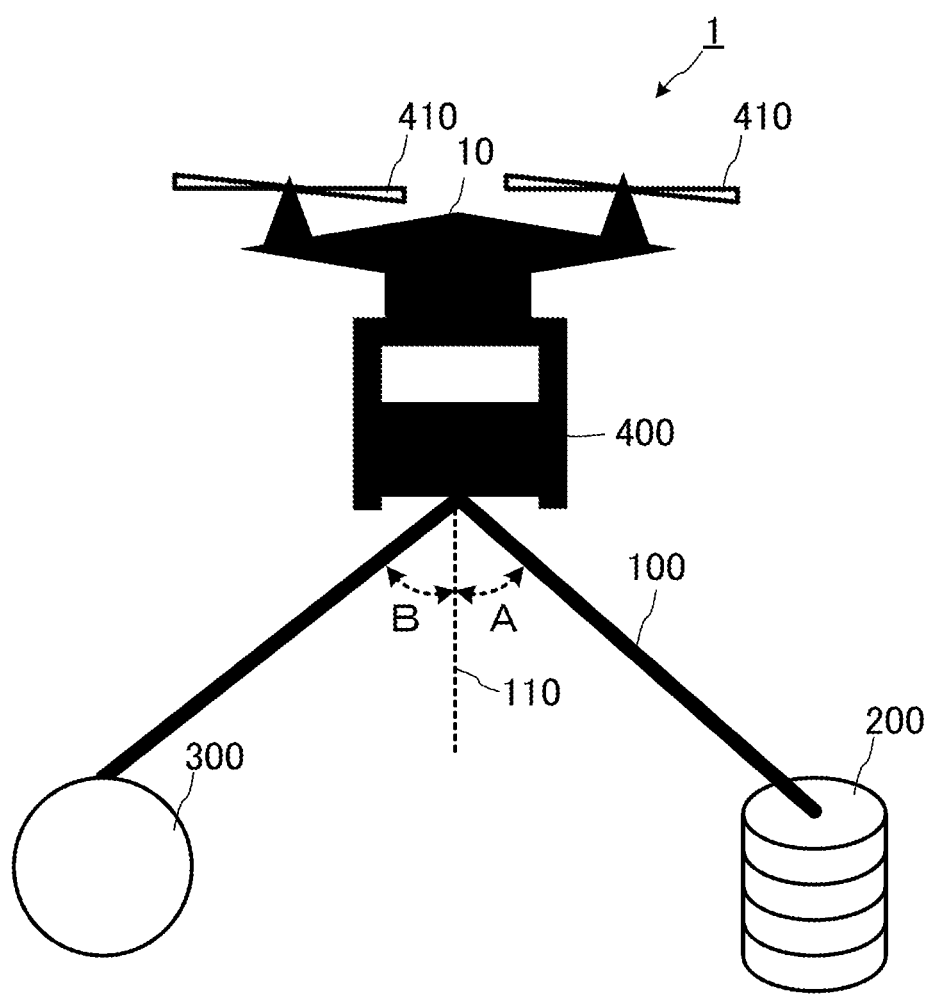
FIG. 1 shows a schematic diagram of the system for adjusting the balance of an insect killer 1.

A preferable embodiment of the present invention will be described below with reference to FIG. 1. FIG. 1 shows an overview of the system for adjusting the balance of an insect killer 1. The system for adjusting the balance of an insect killer 1 includes a robot 10.

The robot 10 is an uninhabited airborne vehicle that flies through a predetermined route by driving the propeller based on an instruction from an information terminal not shown in the attached drawings, a program previously set in the robot 10 itself, or the like.

The robot 10 includes a support arm 100, an insect killer 200, a weight 300, an adjustment unit 400, and a propeller 410. The robot 10 has an adjustment unit 400 in the bottom. The support arm 100 is connected with the adjustment unit 400.

The insect killer 200 is connected with one end of the support arm 100, and the weight 300 is connected with the other end. The support arm 100 is rod-shaped, the center of which is bent. The bent part is connected with the adjustment unit 400. The center of the support arm 100 is moved to adjust the positions of the insect killer 200 and the weight 300. The length between the center and one end of the support arm 100 is the approximated same as that between the center and the other end. Instead of the configuration in which the center is moved, the angle between the lines from the center to an end of the support arm 100 and to the other end may be changed. In this case, the angle A between the direction of gravitational force and the support arm 200 with an end attached to the insect killer and the angle B between the direction and the support arm 300 with the end attached to the weight may be separately adjusted, may be adjusted to equal, or may be adjusted in other ways.

The insect killer 200 is an electrical insect killer, an adhesive insect trap, etc. The upper part of the insect killer 200 is connected with the support arm 100.

The weight 300 is a heavy spheral load. The weight 300 is approximately as heavy as the insect killer 200. A predetermined part of the surface of the weight 300 is connected with the support arm 100. The insect killer 200 and the weight 300 may have a different weight.

The adjustment unit 400 is located in the bottom of the robot 10 and provided with various sensors such as a wind pressure sensor, an acceleration sensor, and an altimeter. For example, the adjustment unit 400 includes a wind pressure sensor that detects wind pressure from the propeller 410 and wind resistance during flight of the robot 10, an acceleration sensor that detects vibration generated from the robot 10, an altimeter that detects flight speed and altitude of the robot 10, and a scale that detects the weights of the insect killer 200 and the weight 300. The robot 10 acquires information on various sensors that has been detected in the adjustment unit 400 as information on the insect killer 200 or the weight 300. The various sensors may be provided in not the adjustment unit 400 but the insect killer 200 or the weight 300. In this case, the robot 10 only has to acquire information on various sensors that has been detected in the insect killer 200, through wired or wireless connection, etc. The robot 10 may acquire the information by other configurations.

The robot 10 acquires information detected in the adjustment unit 400 and then adjusts the positions of the insect killer 200 and the weight 300.

The shapes of the support arm 100, the insect killer 200, and the weight 300 can be appropriately changed, and their configurations are not limited to those mentioned above. The length between the center and one end of the support arm 100 may be different from that between the center and the other end.

The robot 10 takes off by driving the propeller 410 based on an instruction from an information terminal not shown in the attached drawings, an instruction from a proprietary controller, and a predetermined program (Step S01).

The robot 10 adjusts the balance of the insect killer 200 so that the angle between the support arm 100 and the direction of gravitational force from the robot 10 has a predetermined value or more (Step S02). The robot 10 adjusts the angle of the support arm 100 and then the position of the insect killer 200 so that the angle A between the central line 110 shown in the dotted line from the center of the support arm 100 in the direction of gravitational force and the support arm 100 with the end connected to the insect killer 200 has a predetermined value or more. For example, the angel of a predetermined value is set for the angle between the central line 110 and the support arm 100 where the insect killer 200 is not right below the propeller 410 or the angle between the central line 110 and the support arm 100 where the insect killer 200 is away from around the robot 10.

The robot 10 calculates the weight 300 and then adjusts the position of the weight 300 in the negative direction to the angle of the support arm 100 at which the balance of the insect killer 200 is adjusted (Step S03). The robot 10 adjusts the position of the support arm 100 so that the angle B between the central line 110 and the support arm 100 with the end connected to the weight 300 is the same angle as that in the negative direction to the angle A. Specifically, if the angle A is 60 degrees, the position of the support arm 100 is adjusted so that the angle B is −60 degrees.

If the insect killer 200 and the weight 300 may have a different weight, the angle B may be calculated based on the weight 300 and the angle A. In this case, the position of the support arm 100 is adjusted based on the calculated angle B. The length of the support arm 100 and the angle B may be calculated based on the weight 300 and the angle A and then adjust the position of weight 300 based on the length of the support arm 100 and the angle B that have been calculated.

Furthermore, the robot 10 may calculate information on any one of or in combination of any two or more of the wind pressure from the propeller 410, the wind resistance to the insect killer 200, the flight speed, the flight altitude, and the vibration, calculate the angle B based on this calculation result and the angle A, and then adjust the balance between the insect killer 200 and the weight 300.

The robot 10 flies based on an instruction, etc., similar to those during taking off (Step S04).

The robot 10 acquires information on various sensors provided in the adjustment unit 400 during flight (Step S05). For example, the robot 10 acquires information on wind pressure from the propeller 410 and wind resistance during flight of the robot 10, information on vibration generated from the robot 10, and information on the flight speed and the flight altitude of the robot 10.

The robot 10 detects movement of the insect killer 200, adjusts the balance of the insect killer 200 so that the angle between the support arm 100 and the direction of gravitational force from the robot 10 has a predetermined value or more, and then adjusts the position of the weight 300, again (Step S06). The step S06 is processed in the same way as the above-mentioned steps S02 and S03. In the step S06, the balance of the insect killer 200 may be adjusted based on various types of information acquired in the step S05. For example, the robot 10 may calculate information on any one of or in combination of any two or more of the wind pressure from the propeller 410, the wind resistance to the insect killer 200, the flight speed, the flight altitude, and the vibration and then adjust the movement of the insect killer 200 and the weight 300.

Configuration of System for Adjusting the Balance of Insect Killer 1

Figure 2:
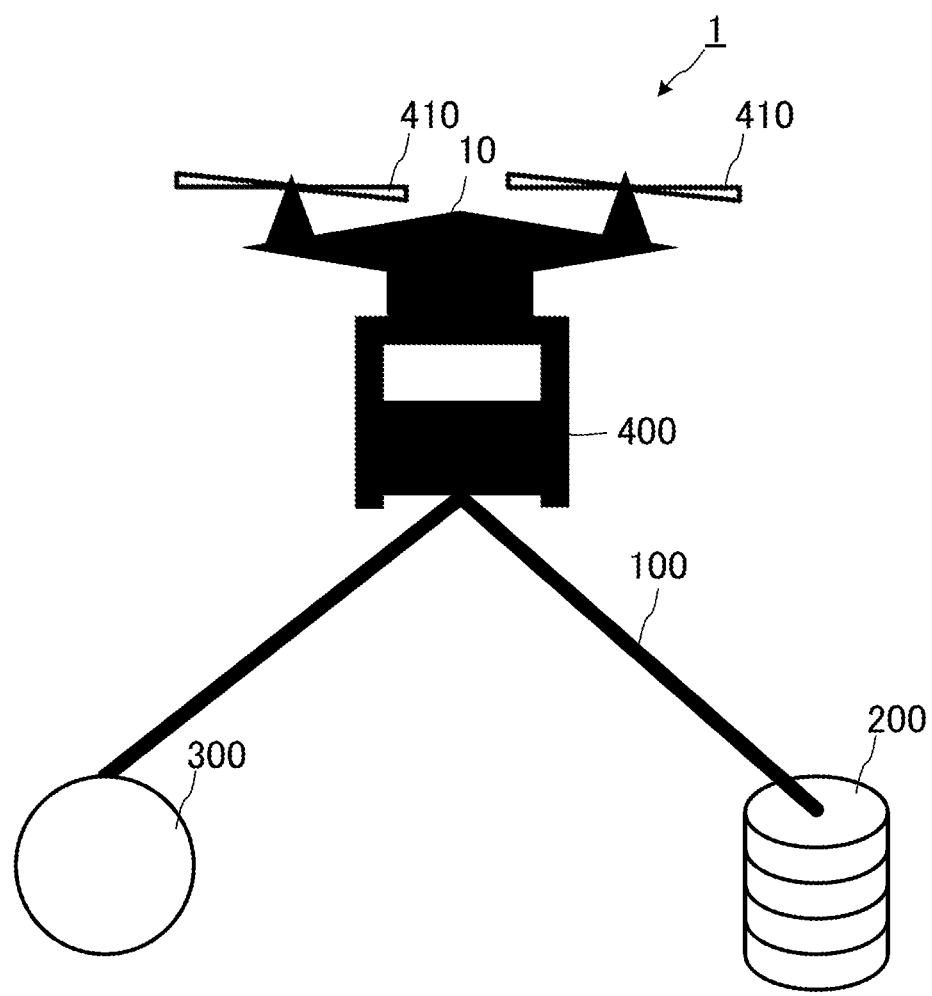
FIG. 2 shows an overall configuration diagram of the system for adjusting the balance of an insect killer 1.

The configuration of the system for adjusting the balance of an insect killer 1 according to a preferable embodiment of the present invention will be described below with reference to FIG. 2. FIG. 2 shows a block diagram illustrating the system for adjusting the balance of an insect killer 1 according to a preferable embodiment of the present invention. The system for adjusting the balance of an insect killer 1 includes a robot 10.

The robot 10 is an uninhabited airborne vehicle that has the functions to be described later. As described above, the robot 10 is connected to the support arm 100 through the adjustment unit 400 provided in the bottom, and the insect killer 200 and the weight 300 are hung from the support arm 100. The support arm 100, the insect killer 200, the weight 300, and the adjustment unit 400 have the above-mentioned respective structures. The adjustment unit 400 adjusts the position of the support arm 100. The adjustment unit 400 adjusts the angle between the support arm 100 from the bent part to the insect killer 200 and the direction of gravitational force from the bent part. The adjustment unit 400 also adjusts the angle between the support arm 100 from the bent part to the weight 300 and the direction of gravitational force from the bent part. The adjustment unit 400 can separately adjust the angle between the support arm 100 from the bent part to one end and the direction of gravitational force from the bent part and the angle between the support arm 100 from the bent part to the other end and the direction of gravitational force from the bent part.

The material, the size, the length, the installation position, the installation method, etc., of the support arm 100, the insect killer 200, or the weight 300 can be appropriately changed. Furthermore, the adjustment unit 400 may be omitted to directly connect the support arm 100 with the robot 10.

In the description below, the length between the bent part of the support arm 100 and the insect killer 200 is assumed to be the approximately same as that between the bent part and the weight 300. Furthermore, the weight of the bent part to the insect killer 200 is assumed to be approximately same as that to the weight 300.

Functions

Figure 3:
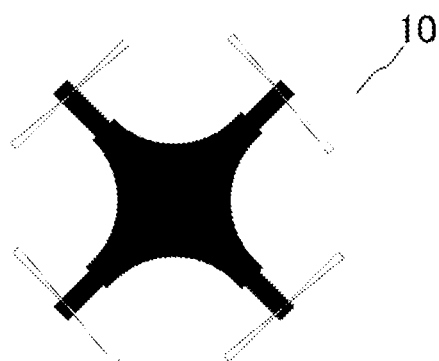
FIG. 3 shows the functional block diagram of the robot 10.
Figure 3:
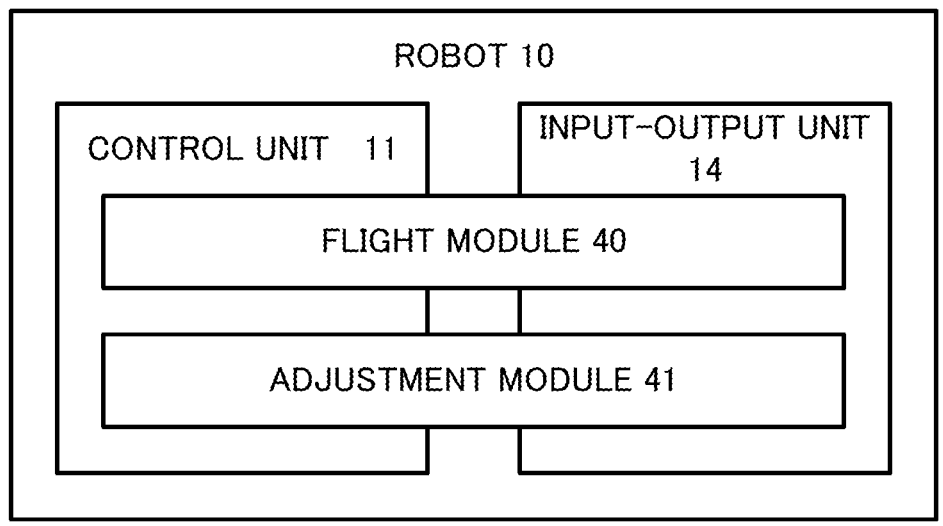

The functions of the system for adjusting the balance of an insect killer 1 according to a preferable embodiment will be described below with reference to FIG. 3. FIG. 3 shows the functional block diagram of the robot 10.

The robot 10 includes a control unit 11 such as a central processing unit (hereinafter referred to as "CPU"), a random access memory (hereinafter referred to as "RAM"), and a read only memory (hereinafter referred to as "ROM") and a communication unit not shown in the attached drawings, such as a device capable of communicating with other devices, for example a Wireless Fidelity or Wi-Fi® enabled device complying with IEEE 802.11. The robot 10 also includes an input-output unit 14 such as various devices, for example, a drive device that drives a motor provided in the adjustment unit 400 and the support arm 100 such as a robot arm, an information acquisition device that acquires information detected by various sensors provided in the adjustment unit 400, and a flight device that drives the propeller for the flight.

In the robot 10, the control unit 11 reads a predetermined program to achieve a flight module 40 and an adjustment module 41 in cooperation with the input unit 14.

Balance Adjustment Process

Figure 4:
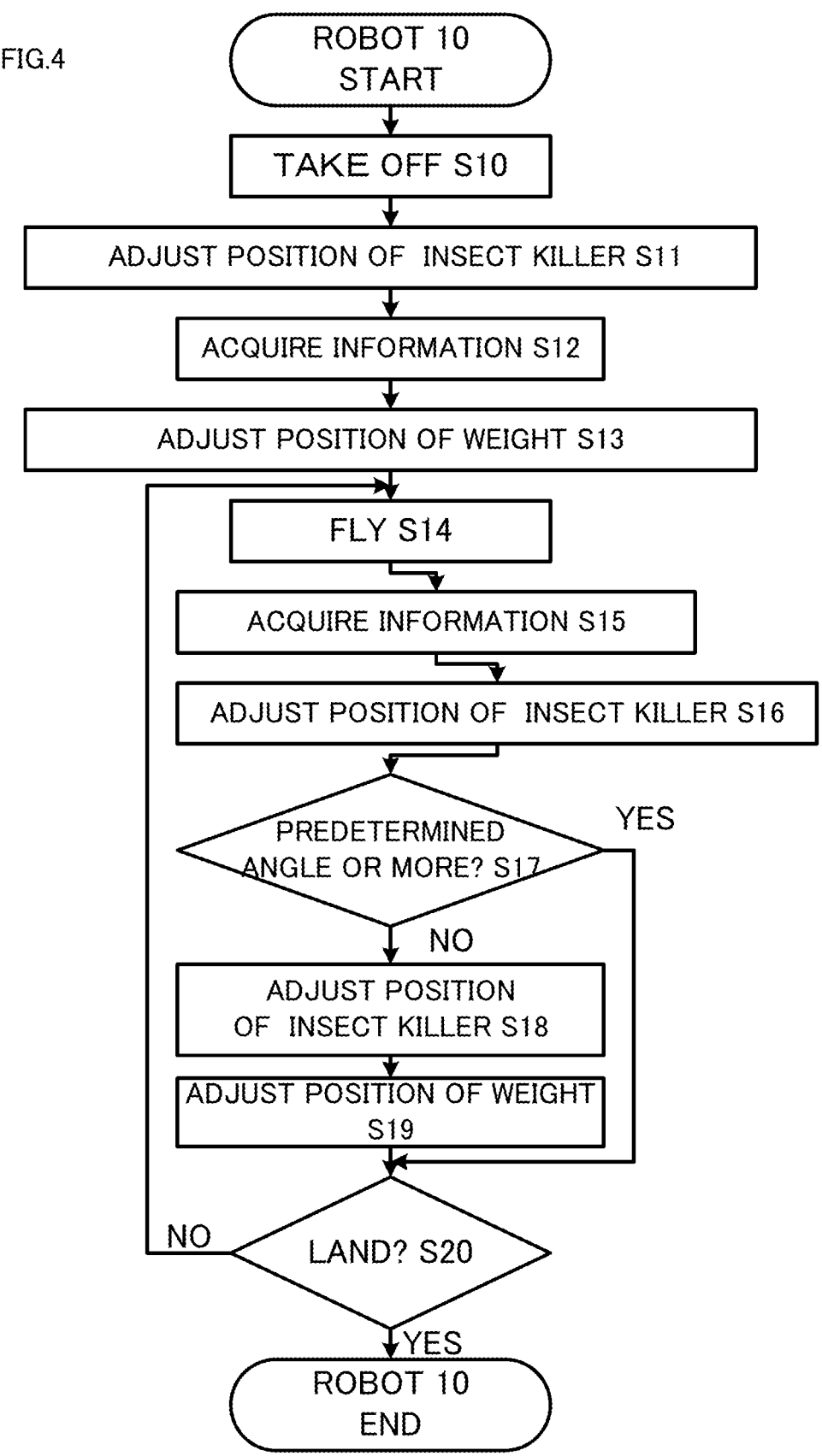
FIG. 4 shows the balance adjustment process performed by the robot 10.

The balance adjustment process performed by the system for adjusting the balance of an insect killer 1 will be described below with reference to FIG. 4. FIG. 4 shows a flowchart illustrating the balance adjustment process performed by the robot 10. The tasks executed by the modules will be described below with this process.

Figure 5:
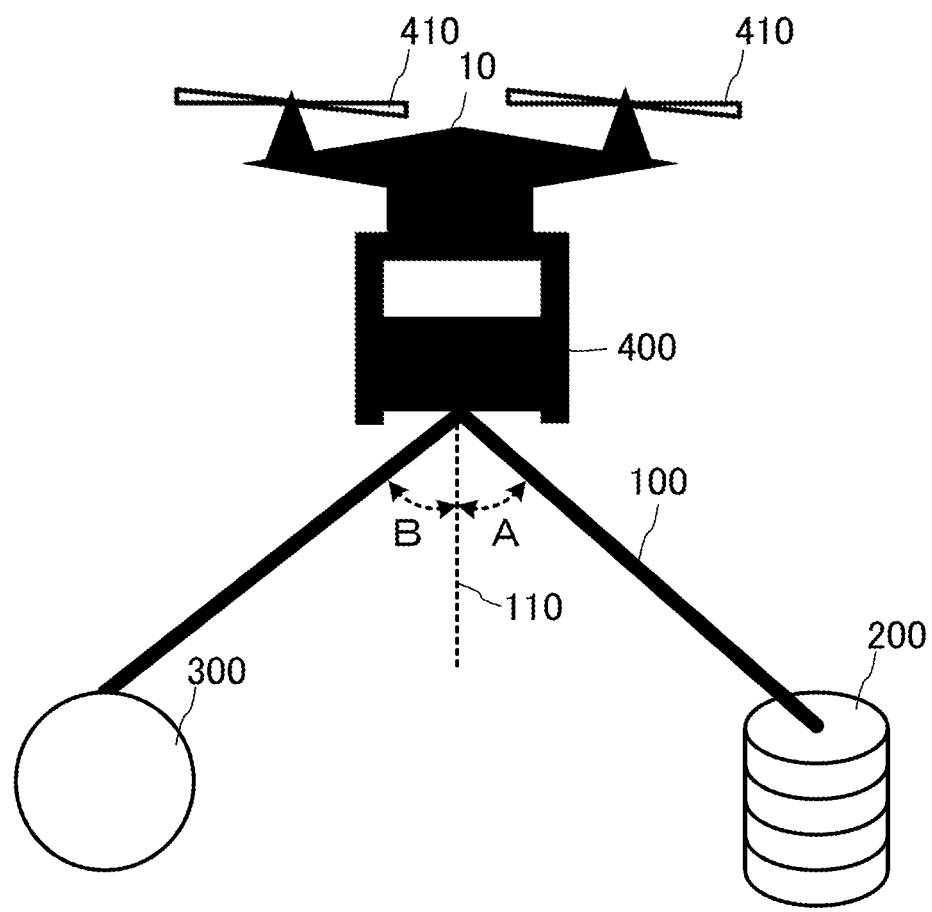
FIG. 5 shows an example of the robot 10.

FIG. 5 shows an example of the robot 10 according to this embodiment. The details about the configuration described below with reference to FIGS. 1 and 2 are omitted.

The robot 10 shown in FIG. 5 will be described below. In FIG. 5, the robot 10 includes an adjustment unit 400 and a propeller 410. The adjustment unit 400 is located in the bottom of the robot 10. The robot 10 drives the propeller 410 to perform takeoff, flight, landing, etc. The drive unit 400 is connected to the support arm 100. The adjustment unit 400 is provided with a motor, a robot arm, and the like that are not shown in the attached drawings. The robot 10 drives the adjustment unit 400 to control the position of the support arm 100. For example, the adjustment unit 400 changes the angle at which the support arm 100 is bent at the bent part, to adjust the positions of the insect killer 200 and the weight 300. The adjustment unit 400 is provided with the above-mentioned various sensors. The robot 10 acquires the wind pressure from a propeller, the wind pressure from an external environment, the traveling direction, the flight speed, the flight altitude, and the vibration that have been detected by various sensors. The robot 10 recognizes that the information detected by various sensors provided in the adjustment unit 400 pertains to the insect killer 200 or the weight 300.

As described above, the various sensors may be provided in the insect killer 200 or the weight 300.

The angle A formed by the base line 110 from the bent part in the direction of gravitational force and the support arm 100 with the end connected to the insect killer 200. The angle B formed by the base line 110 and the support arm 100 with the end connected to the weight 300. The adjustment unit 400 adjusts the angles A and B to adjust the positions of the insect killer 200 and the weight 300. Preferably, this angle A is not affected by wind from the propeller 410. For example, the angle A is preferably an angle where the insect killer 200 is not right below the propeller 410. The angle B is the same as an angle in the negative direction to the angle A. In other words, the absolute values of the angles A and B are the same. For example, if the angle A is 60 degrees, the adjustment unit 400 adjusts the angle B to 60 degrees. In this case, the insect killer 200 and the weight 300 have preferably a same weight. Of course, the insect killer 200 and the weight 300 may have a different weight. In this case, the angle B and the length between the bent part and the end of the support arm 100 that is connected to the weight 300 are preferably adjusted.

The angle B is not necessarily the same as the angle A. For example, the adjustment unit 400 may adjust the angle B in consideration of the influence of the wind from the propeller, the wind from an external environment, the flight speed, the flight altitude, the inertia during the flight, the vibration, the weight 300, the length of the support arm 100, and the like.

Furthermore, the configuration to control the movement of the support arm 100 is not limit to those mentioned above and may be other configurations. For example, the support arm 100 may be extendable and contractable to adjust the length of the support arm 100, may adjust only the angle between the line from the bent part in the direction of gravitational force and the support arm 100 with one end or the other, may adjust the position where the insect killer 200 and the weight 300 are installed, or may combine such adjustments.

The flight module 40 gets the robot 10 off the ground by driving the propeller 410 based on an instruction from an information terminal not shown in the attached drawings, an instruction from a proprietary controller, a predetermined program, or the like (Step S10).

The adjustment module 41 adjusts the balance of the insect killer 200 so that the angle between the support arm 100 and the direction of gravitational force from the robot 10 has a predetermined value or more (Step S11). In the step S11, the adjustment module 41 adjusts the angle A of the support arm 100 so that the insect killer 200 is not located right below the propeller 410.

The adjustment module 41 acquires information detected by various sensors (Step S12). The adjustment module 41 acquires information on the wind pressure from the propeller, the wind pressure from an external environment, the flight speed, the flight altitude, the weights of the insect killer 200 and the weight 300, and the vibration of the robot 10. The insect killer 200 and the weight 300 are assumed to have an approximate same weight in this embodiment but may have a different weight. In this case, the adjustment module 41 only has to adjust the angle B based on the difference between the weights of the insect killer 200 and the weight 300.

The adjustment module 41 adjusts the position of the weight 300 based on the angle A between the direction of gravitational force from the bent part and the support arm 100 with the end connected to the insect killer 200 that is adjusted in the step S11 and based on the information acquired in the step S11 (Step S13). The adjustment module 41 adjusts the position of the weight 300 to adjust the balance between the weight 300 and the insect killer 200. For example, in the step S13, the adjustment module 41 adjusts the position of the weight 300 so that the angle B is equal to the angle A. Furthermore, the adjustment module 41 calculates the information detected by various sensors for the wind pressure from the propeller, the wind resistance to the insect killer 200, the flight altitude, the flight speed, the vibration of the robot 10, and the like and the angle A to adjust the angle B and then the position of the support arm 100 with the end connected to the weight 300. For example, if a high flight speed is detected, the angle A is more acute than the actual angle for the insect killer 200, and therefore the angle B is adjusted to an angle corresponding to the angle A. The same goes for other types of information. Furthermore, the angle B may be calculated based on any one of or in combination of any two or more of these types of information.

In the step S13, if the insect killer 200 and the weight 300 have a different weight, the angle B only has to be changed to more obtuse or more acute. Furthermore, in the step S13, even if the configuration does not have the weight 300, the angle B may be adjusted to adjust the balance of the insect killer 200.

The flight module 40 flies the robot 10 by a process similar to that during takeoff (Step S14).

The adjustment module 41 acquires information detected by various sensors (Step S15). In the step S15, the adjustment module 41 acquires information similar to that is acquired in the process of the above-mentioned step S12.

The adjustment module 41 acquires the position of the insect killer 200 (Step S16). In the step S16, the adjustment module 41 acquires the angle A to acquire the position of the insect killer 200.

The adjustment module 41 may acquire the position of the insect killer 200 based on another element such as the length of the support arm 100 in addition to the angle A.

The adjustment module 41 judges whether or not the insect killer 200 is located at the angle A of a predetermined value or more (Step S17). In the step S17, the adjustment module 41 judges, for example, whether or not the insect killer 200 exists at a position different from the position during the takeoff from the influence of the wind and the inertia, or whether or not the insect killer 200 exists at a position where the insect killer 200 is affected by wind from the propeller.

If the adjustment module 41 judges that the insect killer 200 is located at the angle A of a predetermined value or more (YES) in the step 17, the process of the step S20 to be described later is performed.

On the other hand, if the adjustment module 41 judges that the insect killer 200 is located at the angle A of less than a predetermined value (NO) in the step 17, the processes similar to the steps S11 and S13 are performed (Steps S18 and S19). In the steps S18 and S19, the adjustment module 41 uses information acquired in the step S15.

The flight module 40 judges whether or not to land the robot 10 (Step S20). In the step S20, the flight module 40 judges whether or not to land the robot 10 based on landing instruction from an information terminal not shown in the attached drawings, based on whether or not the flight has completed through a predetermined route, or based on whether or not the battery level has fallen below a predetermined value, for example.

If judging not to land the robot 10 (NO) in the step S20, the flight module 40 performs the step S14 again.

On the other hand, if judging to land the robot 10 (YES) in the step S20, the flight module 40 ends the balance adjustment process.

Accordingly, the position of the insect killer 200 can be adjusted so that the insect killer 200 hung from the robot 10 through the support arm 100 is located at the angle A of a predetermined value or more where the insect killer 200 is located not right below the robot 10. Furthermore, the balance of the insect killer 200 can be adjusted by calculating the wind pressure from the propeller 410, the wind resistance during the flight, the flight speed, the flight altitude, and the vibration.

The robot 10 may associate, store, and learn the angles A and B with information detected by various sensors. For example, if detecting already learned information on wind pressure, flight speed, flight altitude, and vibration, the robot 10 may adjust the position of the support arm 100 to have the angles A and B of the respective stored values to adjust the positions of the insect killer 200 and the weight 300. Furthermore, the robot 10 estimates the timing to change the position of the insect killer 200 or the weight 300 based on the stored various types of information and the angles A and B to adjust the position of the insect killer 200 or the weight 300. For example, the robot 10 may adjust the position of the insect killer 200 or the weight 300 based on information on a weather forecast, a programmed flight route, a date and time, etc., before an actual detection result is acquired from sensors.

Accordingly, the robot 10 can automatically determine the best control during flight even if an article is hung from the support arm 100 in addition to the insect killer 200 or even if the robot 10 catches a gust of wind.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

1 System for adjusting balance of insect killer
10 Robot
100 Support arm
200 Insect killer
300 Weight
400 Adjustment unit

What is claimed is:

1. A system for adjusting a balance of a pesticide hung from a helicopter drone, comprising:
   a counterweight;
   a support arm extending downward of the helicopter drone and bent at a bent part connected with the helicopter drone, and having a first end connected with the pesticide and a second end connected with the counterweight;
   a motor that changes an angle at which the support arm is bent at the bent part, to adjust positions of the pesticide and the counterweight;
   a drive device that drives the motor;
   a processor that controls the drive device:
   to adjust the balance of the pesticide to make, through the motor, a first angle between a first portion of the support arm and a direction of gravitational force be a predetermined value or more, the first portion being a portion from the bent part to the first end in the support arm; and
   to adjust, through the motor, a second angle between a second portion of the support arm and the direction of gravitational force in a direction opposite to a direction in which the first angle is adjusted, based on a magnitude of the first angle, thereby adjusting the balance of the pesticide, the second portion being a portion from the bent part to the second end in the support arm.

2. The system according to claim 1, wherein the counterweight is approximately as heavy as the pesticide.

3. The system according to claim 1, wherein the processor detects wind pressure from a propeller provided with the helicopter drone, calculates the detected wind pressure, and adjusts the balance of the pesticide.

4. The system according to claim 1, wherein the processor detects wind resistance to the pesticide during flight of the helicopter drone, calculates the detected wind resistance, and adjusts the balance of the pesticide.

5. The system according to claim 1, wherein the processor detects a flight speed during flight of the helicopter drone, detects a flight altitude during flight of the helicopter drone, calculates the detected flight speed and altitude, and adjusts the balance of the pesticide.

6. The system according to claim 1, wherein the processor detects vibration of the helicopter drone, calculates the detected vibration, and adjusts the balance of the pesticide.

7. A method for adjusting a balance of a pesticide hung from a helicopter drone, comprising:
   adjusting the balance of the pesticide to make a first angle between a first portion of a support arm and a direction of gravitational force be a predetermined value or more, the support arm extending downward of the helicopter drone and bent at a bent part connected with the helicopter drone, and having a first end connected with the pesticide and a second end connected with a counterweight, and the first portion being a portion from the bent part to the first end in the support arm; and
   adjusting a second angle between a second portion of the support arm and the direction of gravitational force in a direction opposite to a direction in which the first angle is adjusted, based on a magnitude of the first angle, thereby adjusting the balance of the pesticide, the second portion being a portion from the bent part to the second end in the support arm.

8. A computer program product comprising a non-transitory computer usable medium having a set of instructions physically embodied therein, the set of instructions including computer readable program code causing a computer to execute to:

adjust a balance of a pesticide for chemical spray hung from a helicopter drone to make a first angle between a first portion of a support arm and a direction of gravitational force to be a predetermined value or more, the support arm extending downward of the helicopter drone and bent at a bent part connected with the helicopter drone, and having a first end connected with the pesticide and a second end connected with a counterweight, and the first portion being a portion from the bent part to the first end in the support arm; and adjust a second angle between a second portion of the support arm and the direction of gravitational force in a direction opposite to a direction in which the first angle is adjusted, based on a magnitude of the first angle, thereby adjusting the balance of the pesticide, the second portion being a portion from the bent part to the second end in the support arm.

9. The system according to claim 2, wherein a magnitude of the second angle is equal to the magnitude of the first angle.

10. The method according to claim 7, wherein the counterweight is approximately as heavy as the pesticide.

11. The method according to claim 10, wherein a magnitude of the second angle is equal to the magnitude of the first angle.

12. The computer program product according to claim 8, wherein the counterweight is approximately as heavy as the pesticide.

13. The computer program product according to claim 12, wherein a magnitude of the second angle is equal to the magnitude of the first angle.

* * * * *